US009594582B2

(12) United States Patent
Ciano et al.

(10) Patent No.: US 9,594,582 B2
(45) Date of Patent: *Mar. 14, 2017

(54) DETECTION AND MANAGEMENT OF DYNAMIC MIGRATION OF VIRTUAL ENVIRONMENTS

(75) Inventors: Giuseppe Ciano, Rome (IT); Luigi Pichetti, Rome (IT); Paolo Salerno, Monterotondo (IT)

(73) Assignee: International Business Machines Corporation, Armonk, NY (US)

(*) Notice: Subject to any disclaimer, the term of this patent is extended or adjusted under 35 U.S.C. 154(b) by 2268 days.

This patent is subject to a terminal disclaimer.

(21) Appl. No.: 12/348,396

(22) Filed: Jan. 5, 2009

(65) Prior Publication Data

US 2010/0175063 A1 Jul. 8, 2010

(51) Int. Cl.
G06F 9/455 (2006.01)
G06F 21/10 (2013.01)
G06F 9/48 (2006.01)

(52) U.S. Cl.
CPC ........ *G06F 9/45558* (2013.01); *G06F 9/4862* (2013.01); *G06F 21/105* (2013.01); *G06F 2009/4557* (2013.01)

(58) Field of Classification Search
None
See application file for complete search history.

(56) References Cited

U.S. PATENT DOCUMENTS 5,907,621 A * 5/1999 Bachman et al. ............ 713/155
6,041,357 A * 3/2000 Kunzelman et al. ......... 709/228
6,233,617 B1 5/2001 Rothwein et al.

(Continued)

FOREIGN PATENT DOCUMENTS

EP 1917634 A2 * 5/2008

OTHER PUBLICATIONS

Clark et al., "Live Migration of Virtual Machines", 2005, 2nd Symposium on Networked Systems Design & Implementation, NSDI '05.*

(Continued)

*Primary Examiner* — Lewis A Bullock, Jr.
*Assistant Examiner* — Kevin X Lu
(74) *Attorney, Agent, or Firm* — Stephen R. Tkacs; Stephen J. Walder, Jr.; Richard A. Wilhelm

(57) ABSTRACT

A mechanism is provided to detect that a dynamic migration of a virtual environment is in progress or has been executed during a hardware or software scan without requiring instrumentation of applications running within the virtual machine. The mechanism relies on a particular sequencing and usage of application programming interfaces and commands that scanning technology provides, associated with the modularity of the scans and on the external virtual machine enabler component running on the host. The mechanism may detect a dynamic migration and take proper actions based on the system configuration. The actions may include discarding the output of the scan executed across a dynamic migration and repeat the scan. The actions may also include notifying the initialization subsystem of the non-migration-safe application to execute a script or program to address migration safety issues. One particular program or script may be an agent ID regeneration program or script.

19 Claims, 3 Drawing Sheets

(56) References Cited

U.S. PATENT DOCUMENTS

| | | | |
|---|---|---|---|
| 7,188,181 B1 | 3/2007 | Squier et al. | |
| 7,257,811 B2 | 8/2007 | Hunt et al. | |
| 7,278,131 B2 * | 10/2007 | Gunyakti et al. | 717/107 |
| 7,313,512 B1 | 12/2007 | Traut et al. | |
| 7,356,679 B1 * | 4/2008 | Le et al. | 713/1 |
| 7,680,919 B2 | 3/2010 | Nelson | |
| 7,805,375 B2 * | 9/2010 | Fox et al. | 705/59 |
| 7,865,893 B1 * | 1/2011 | Omelyanchuk et al. | 718/1 |
| 7,904,914 B2 * | 3/2011 | Green et al. | 719/321 |
| 7,996,679 B2 | 8/2011 | Hsu et al. | |
| 8,117,667 B2 * | 2/2012 | Merkle et al. | 726/29 |
| 8,127,296 B2 * | 2/2012 | Khatri et al. | 718/104 |
| 8,151,327 B2 | 4/2012 | Eisen | |
| 8,443,358 B1 * | 5/2013 | Larkin et al. | 717/174 |
| 2002/0129126 A1 * | 9/2002 | Chu et al. | 709/220 |
| 2004/0030912 A1 * | 2/2004 | Merkle et al. | 713/200 |
| 2005/0138563 A1 * | 6/2005 | Cromer et al. | 715/735 |
| 2006/0004667 A1 * | 1/2006 | Neil | 705/59 |
| 2006/0294120 A1 * | 12/2006 | Li et al. | 707/100 |
| 2007/0067433 A1 * | 3/2007 | D'Alterio et al. | 709/223 |
| 2008/0319779 A1 * | 12/2008 | Hughes et al. | 705/1 |
| 2009/0083736 A1 * | 3/2009 | Goto | G06F 12/1491 718/1 |
| 2009/0228629 A1 * | 9/2009 | Gebhart et al. | 711/6 |
| 2009/0249366 A1 * | 10/2009 | Sen et al. | 719/327 |

OTHER PUBLICATIONS

Unknown Author, MS TechNet "Hardware Profiles", technet.microsoft.com/en-us/library/cc959503.aspx, Feb. 2002.*

USPTO U.S. Appl. No. 13/418,677.

Office Action mailed Jun. 19, 2012 for U.S. Appl. No. 13/418,677; 13 pages.

Khanna, Gunjan et al., "Application Performance Management in Virtualized Server Environments", IEEE, 2006, pp. 373-381.

Oberheide, Jon et al., "Empirical Exploitation of Live Virtual Machine Migration", University of Michigan, Proc of Blackhat, 2008, 7 pages.

Wen, Yan et al., "Implicit Detection of Hidden Processes with a Feather-Weight Hardware-Assisted Virtual Machine Monitor", Springer-Verlag Berlin Heidelberg, 2008, 15 pages.

Zou, Deqing et al., "A Trusted Group Signature Architecture in Virtual Computing an Environment", Huazhong University, Springer-Verlag Berlin Heidelberg, 2008, 13 pages.

Notice of Allowance mailed Nov. 5, 2012 for U.S. Appl. No. 13/418,677; 7 pages.

Response to Office Action filed with the USPTO on Sep. 18, 2012 for U.S. Appl. No. 13/418,677, 10 pages.

* cited by examiner

DETECTION AND MANAGEMENT OF DYNAMIC MIGRATION OF VIRTUAL ENVIRONMENTS

BACKGROUND

The present application relates generally to an improved data processing apparatus and method and more specifically to efficient detection and management of dynamic migration of virtual environments.

Logical partitioning (LPAR) is the ability to make a server run as if it were two or more independent servers. When one partitions a server, one divides the resources on the server into subsets called logical partitions. Processors, memory and input/output devices are examples of resources that can be assigned to logical partitions. A logical partition runs as an independent logical server with the processor, memory, and I/O resources allocated to it. Examples of the kinds of software that can be installed and run on logical partitions include the AIX®, i5/OS™, and Linux® operating systems and Virtual I/O Server software. "AIX" and "i5/OS" are trademarks of International Business Machines Corporation in the United States, other countries, or both. "LINUX" is a trademark of Linus Torvalds in the United States, other countries, or both.

Although each logical partition may act as an independent server, the logical partitions on a physical server can share some kinds of resources with each other. The ability to share resources among many logical partitions allows increased resource utilization on the server by shifting the server resources to where they are needed.

A processor is a device that processes programmed instructions. The more processors assigned to a logical partition, the greater the number of concurrent operations the logical partition can run at any given time. Dedicated processors are whole processors that are assigned to a single partition. Shared processors are physical processors whose processing capacity is shared among multiple logical partitions. The shared processor pool includes all processors on the server that are not dedicated to specific logical partitions. Each logical partition that uses the shared processor pool is assigned a specific amount of processor power from the shared processor pool. If the logical partition needs more processor power than its assigned amount, the logical partition is set by default to use the unused processor power in the shared processor pool. The amount of processor power that the logical partition can use is limited only by the virtual processor settings of the logical partition and the amount of unused processor power available in the shared processor pool.

In this case, the server firmware provides virtualization of resources to the operating systems (partitions) running on the server. Virtualization is an abstraction layer that allows multiple virtual environments, possibly with heterogeneous operating systems, to run in isolation, side-by-side on the same physical machine. Virtualization decouples the physical hardware from the operating systems and hides physical information and resources. Each partition or virtual environment runs as if it is executing on its own dedicated machine even though the physical resources are virtualized and may be assigned from a shared pool of resources. For this reason, a partition or virtual environment may also be referred to as a virtual machine (VM). Therefore, the terms "logical partition," "virtual environment," and "virtual machine" may be used interchangeably in this disclosure.

In some virtualization technology, resources may be dynamically allocated and de-allocated. Also, some virtualization technology includes dynamic migration, which may dynamically move live, running virtual machines from one host to another while maintaining continuous service availability. Dynamic migration may move a virtual environment from one time slice of a processor to another, from one processor to another, from one blade to another within the same server chassis, or even from one server chassis to another; with virtualization, the idea of what is a "host" depends on how the hardware resources are partitioned.

The abstraction and decoupling, combined with dynamic migration, may introduce new scenarios in customer environments. For example, dynamic migration of virtual environments without suspending or stopping the virtual machine may pose new challenges in current system management processes. In fact, running in a virtual environment, it may be difficult, if not impossible, to detect that a dynamic migration is in progress or has been executed.

Most applications can simply stay unaware of the ongoing migration and, thus, run safely in this scenario. However, some management applications can neither ignore nor easily solve associated problems. For instance, applications that rely on the virtual machine or host capacity are not migration-safe. As an example, for a licensing control application, a hardware scan can provide inconsistent capacity information, if such a scan happens across a dynamic migration. Such a scenario may lead to an incorrect licensing computation.

SUMMARY

In one illustrative embodiment, a method, in a data processing system, is provided for detecting and managing dynamic migration of virtual environments. The method comprises retrieving a host component identifier to form a first retrieved host component identifier, performing a physical environment scan, retrieving the host component identifier to form a second retrieved host component identifier, and responsive to the second retrieved host component identifier being different from the first retrieved host component identifier, detecting a dynamic migration of a virtual environment and performing at least one action to manage the dynamic migration of the virtual environment.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
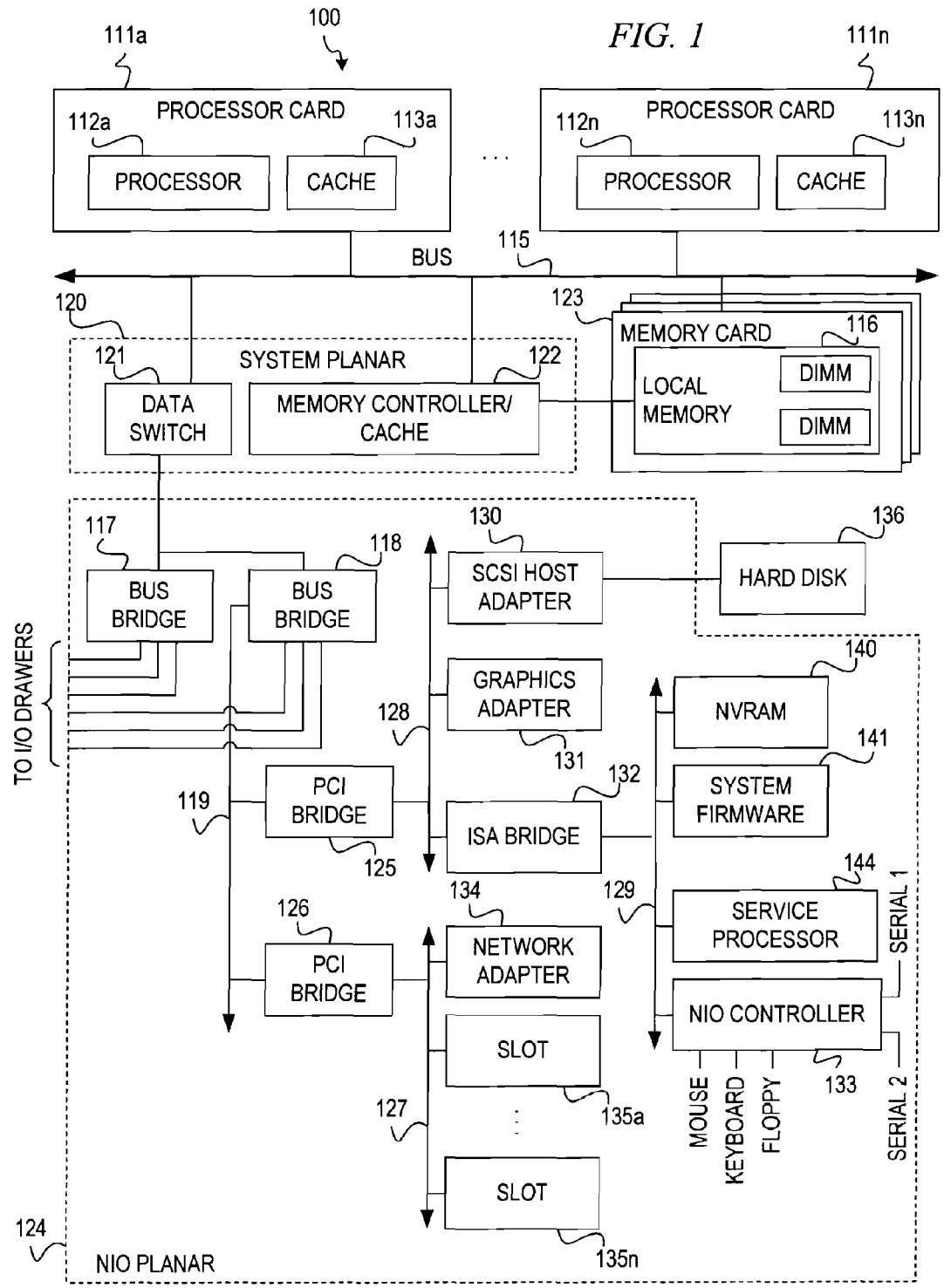
FIG. 1 depicts a block diagram of a data processing system with which aspects of the illustrative embodiments may be utilized.

The illustrative embodiments provide a mechanism for efficient detection and management of dynamic migration of virtual environments. The illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as an example environment in which aspects of the illustrative embodiments may be implemented. While the description following FIG. 1 will focus primarily on a single data processing device implementation, this is only an example and is not intended to state or imply any limitation with regard to the features of the present invention.

Referring now to the drawings and in particular to FIG. 1, there is depicted a block diagram of a data processing system with which aspects of the illustrative embodiments may be utilized. As shown, data processing system 100 includes processor cards 111a-111n. Each of processor cards 111a-111n includes a processor and a cache memory. For example, processor card 111a contains processor 112a and cache memory 113a, and processor card 111n contains processor 112n and cache memory 113n.

Processor cards 111a-111n are connected to main bus 115. Main bus 115 supports a system planar 120 that contains processor cards 111a-111n and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140, which connects to ISA bus 129, provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

Each operating system (OS) is stored on hard disk 136, which may also provide storage for additional application software for execution by data processing system 100. NVRAM 140 is used to store system variables and error information for field replaceable unit (FRU) isolation. During system startup, the bootstrap program loads the server firmware and initiates a virtual environment container for each virtual environment in which an operating system and one or more applications execute. A container is a class or data structure that implements predefined rules that specify a runtime environment. These rules may include, for example, security, concurrency, life-cycle management, transaction, deployment, and other services. A container may provide application programming interfaces (APIs) for interacting with the operating system and hardware.

To load the operating systems, the bootstrap program first locates an operating system kernel type from hard disk 136, loads the OS into memory, and jumps to an initial address provided by the operating system kernel. Typically, each operating system is loaded into random-access memory (RAM) of its respective virtual environment, as partitioned and allocated by the virtualization technology within the server firmware. Once loaded and initialized, each operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

Figure 2:
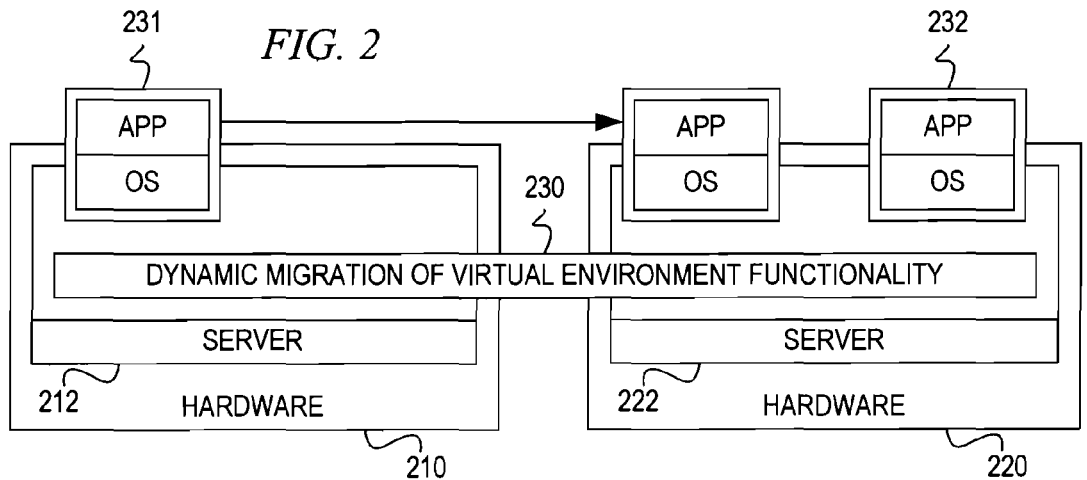
FIG. 2 is a block diagram illustrating dynamic migration of virtual environments in accordance with an illustrative embodiment.

FIG. 2 is a block diagram illustrating dynamic migration of virtual environments in accordance with an illustrative embodiment. Hardware platform 210 runs server firmware/software 212. Hardware platform 220 runs server firmware/software 222. Hardware platforms 210, 220 may be allocated resources within the same physical server, such as time shares on the same processor, one or more processors within the same physical server, blades within the same chassis, or separate chassis.

Dynamic migration of virtual environment functionality 230 exists within server firmware/software 212 and server firmware/software 222. Virtual environment 231 includes an operating system and at least one application running in a virtual environment container on server firmware/software 212 and hardware platform 210. Virtual environment 232 includes an operating system and at least one application running in a virtual environment container on server firmware/software 222 and hardware platform 220. Dynamic migration functionality 230 allows virtual environment 231 to migrate to server 222 on hardware platform 220.

Many applications can simply stay unaware of an ongoing migration; however, other applications can neither ignore nor easily solve problems that may occur due to dynamic migration from one server environment to another. For example, applications that rely on the host capacity (e.g., computation power) are not migration-safe. As a specific example, for a licensing control application the hardware scan may provide inconsistent capacity if such a scan happens across a dynamic migration. Such a scenario may lead to incorrect licensing computation.

One way to address this issue is to instrument each of the applications that are not migration-safe to intercept specific events that the virtualization technology may trigger inside the virtual machine container. Thus, these events may alert about an ongoing migration. However, this instrumentation must be done for every virtualization technology, and besides being a slow and computationally intensive process, not every virtualization technology provides an instrumentation software development kit (SDK); therefore, such instrumentation may be difficult to implement.

In accordance with an illustrative embodiment, a mechanism is provided to detect that a dynamic migration of a virtual environment is in progress or has been executed during a hardware or software scan without requiring instrumentation of applications running within the virtual machine. The mechanism relies on a particular sequencing and usage of application programming interfaces (APIs) and commands that scanning technology provides, associated with the modularity of the scans and on the external virtual machine enabler component running on the host. Examples of scanning technologies include Tivoli Common Inventory Technology (CIT), for example. In the depicted example, an "external" component runs on the host and not inside the VM.

The mechanism may detect a dynamic migration and take proper actions based on the system configuration. The actions may include discarding the output of the scan executed across a dynamic migration and repeat the scan. The actions may also include notifying the initialization subsystem of the non-migration-safe application to execute a script or program to address migration safety issues. One particular program or script may be an agent identifier (ID) regeneration program or script.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
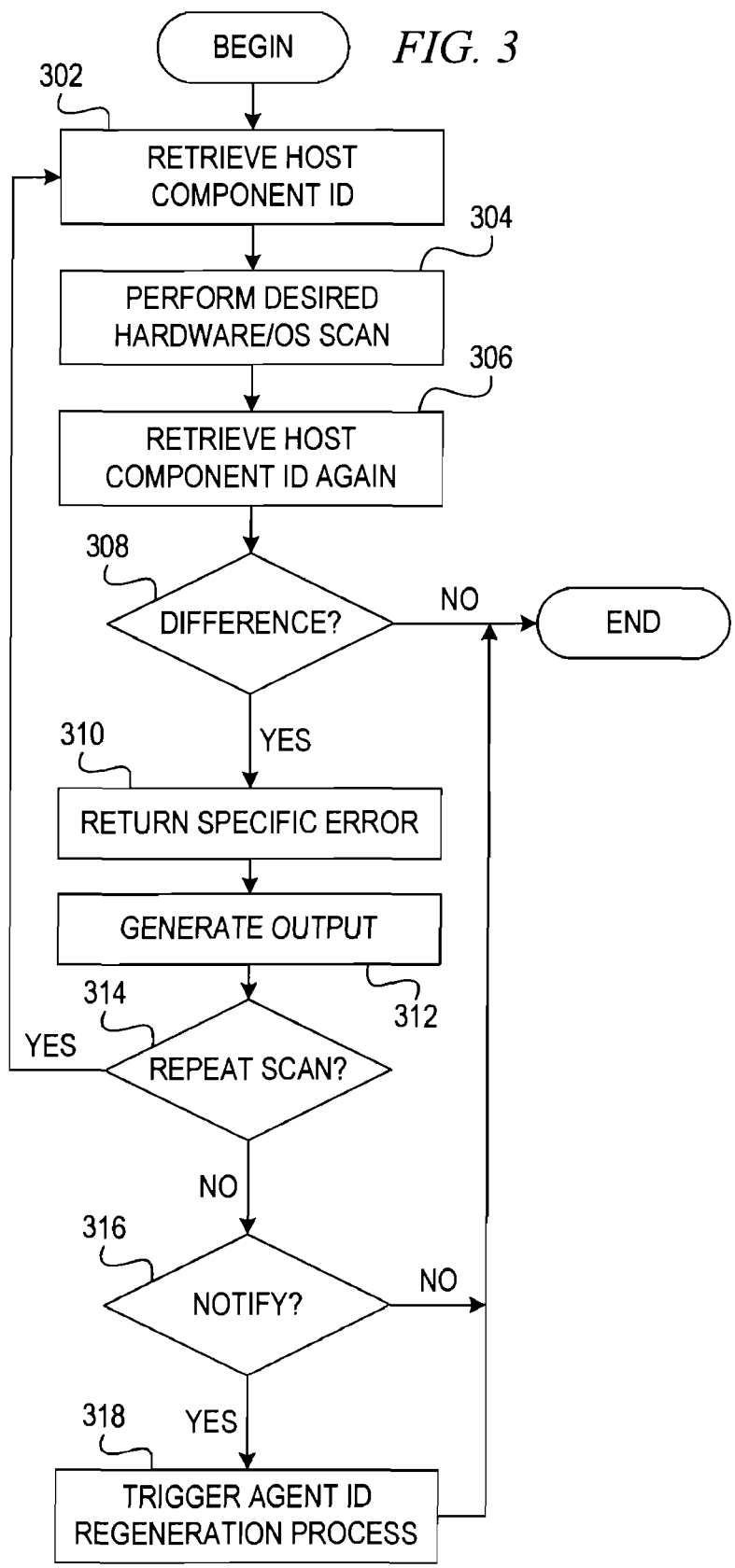
FIG. 3 is a flowchart outlining example operations of performing a hardware scan with detection and management of dynamic migration of virtual environments in accordance with an illustrative embodiment.

FIG. 3 is a flowchart outlining example operations of performing a hardware scan with detection and management of dynamic migration of virtual environments in accordance with an illustrative embodiment. A hardware (HW)/software (SW)/operating system (OS) scan takes place inside a virtual machine, like in any non-virtual environment. However, the scanning technology is able to optionally access additional information that a virtual machine enabler component running on the host periodically publishes into the hosted virtual machines. This is generally possible, although it varies in each virtualization technology. For instance, CIT supports this in VMWare environments.

Operation begins, and the virtual machine motion-safe scan retrieves the host component identifier (ID) (block 302). The host component ID contains the list of all, and only the real, system information, such as, for example, machine serial number, type, and model. The retrieval of the host component ID is an extremely quick scan compared to the regular full scan, thanks to the modularity of the scan engine. Thereafter, the virtual machine motion-safe scan performs the desired hardware/OS scan (block 304). Then, the virtual machine motion-safe scan retrieves the host component ID again (block 306).

The scan then determines whether the host component ID retrieved in block 306 is different from the host component ID retrieved in block 302 (block 308). If the retrieved host component IDs are not different, then operation ends. Otherwise, if the retrieved host component IDs are different in block 308, the scan returns a specific error (block 310), such as RC_INCONSISTENT_OUTPUT, and generates output (block 312). Optionally, and not shown, the virtual machine motion-safe scan may send a signal, such as, for example, SIGHUP, to the calling application.

Thereafter, the virtual machine motion-safe scan determines whether to repeat the scan (block 314). The virtual machine motion-safe scan may receive in the call from the calling application a Boolean parameter that identifies whether to repeat the scan if virtual machine motion is detected. Thus, the determination in block 314 may simply examine the parameter, e.g., RepeatScanIfVMotionDetected, to determine whether to repeat the scan. If the virtual machine motion-safe scan determines to repeat the scan, operation returns to block 302 to retrieve the host component ID.

If the virtual machine motion-safe scan determines to not repeat the scan, the virtual machine motion-safe scan determines whether to notify the non-migration safe application that migration of a virtual machine has been detected (block 316). The virtual machine motion-safe scan may receive in the call from the calling application a Boolean parameter that identifies whether to notify if virtual machine motion is detected. Thus, the determination in block 316 may simply examine the parameter, e.g., NotifyIfVMotionDetected, to determine whether to notify the non-migration-safe application. If the virtual machine motion-safe scan determines to not notify the application, operation ends. If the scan determines to notify the non-migration-safe application in block 316, the scan triggers an agent ID regeneration process (block 318), which will be described in further detail below with reference to FIG. 4. The scan may also provide additional information like the host component ID retrieved in block 302, date time, etc. Thereafter, operation ends.

Figure 4:
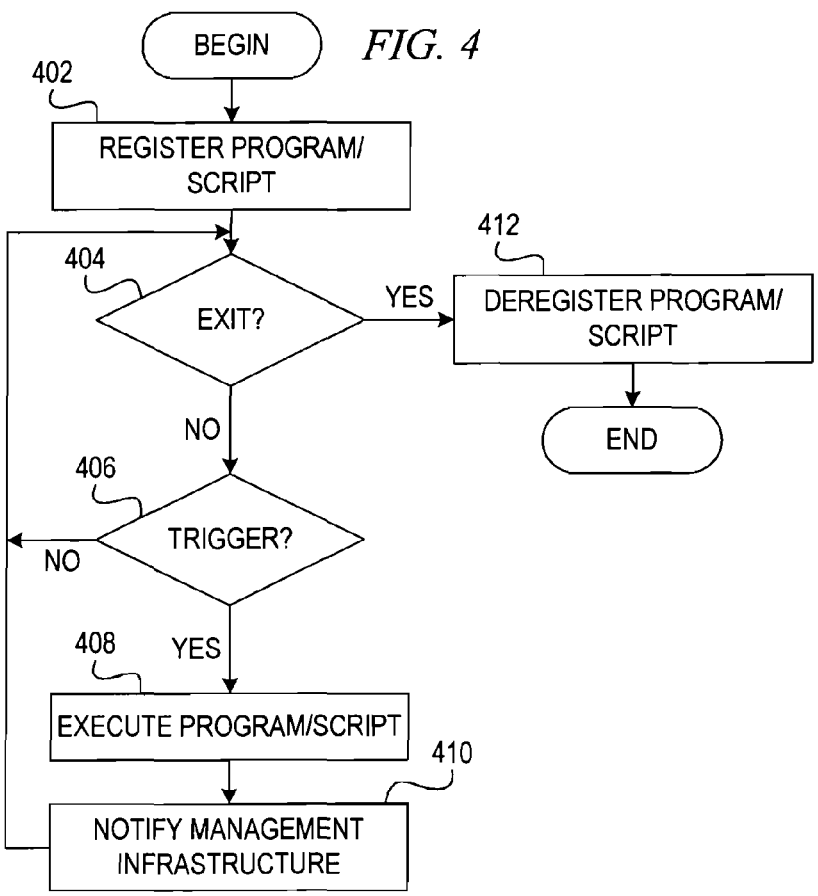
FIG. 4 is a flowchart illustrating operation of an agent ID regeneration process in accordance with an illustrative embodiment.

FIG. 4 is a flowchart illustrating operation of an agent ID regeneration process in accordance with an illustrative embodiment. Operation begins, and the agent ID regeneration process registers a program/script (block 402). This program or script is to be executed if a specific event occurs. For example, if the above described virtual machine motion-safe scan detects migration of a virtual environment, the program or script may address or prevent problems associated with a dynamic migration. The program or script will vary from application to application, as the problems that may be encountered will be dependent on the application.

Then, the agent ID regeneration process determines whether an exit condition exists (block 404). An exit condition may be, for example, a specific instruction or command to end the agent ID regeneration process. If an exit condition does not exist, the agent ID regeneration process determines whether a hardware/OS scan has detected a virtual machine migration and, thus, triggered agent ID regeneration (block 406). If a HW/OS scan has not triggered agent ID regeneration, operation returns to block 404 to determine whether an exit condition exists.

If a HW/OS scan has triggered the agent ID regeneration process in block 406, the agent ID regeneration process executes the program/script (block 408). Then, the agent ID regeneration process notifies the management infrastructure to which the agent belongs (block 410). Thereafter, operation returns to block 404 to determine whether an exit condition exists.

In one example scenario, a license management application, an "agent" is an example of a "non-migration-safe" application. A license management application, like Tivoli License Manager from IBM, is typically made up of a server-component, where all collected metrics about license usage are aggregated, and several "agents" which run on all the operating systems where license metrics have to be collected. The agent is the part of the license management application which collects metrics, and the management infrastructure is the server part of the license management application which receives all collected (license) metrics from the different agents. As some modern and sophisticated licensing models are bound to the capacity of the machine (e.g., for a given software you pay license fees depending on the number of processors of the machine on which the software runs), it is imperative to support such models, that a licensing agent (non-migration-safe application) is able to detect such altered conditions and communicate (e.g., thru the notification of an occurred "agent ID regeneration process") them to the licensing server (or "management infrastructure").

Returning to block 404, if an exit condition does exist, the agent ID regeneration process deregisters the program/script (block 412). Thereafter, operation ends.

Thus, the illustrative embodiments provide mechanisms to detect that a dynamic migration of a virtual environment is in progress or has been executed during a hardware or software scan without requiring instrumentation of applications running within the virtual machine. The mechanism relies on a particular sequencing and usage of application programming interfaces and commands that scanning technology provides, associated with the modularity of the scans and on the external virtual machine enabler component running on the host. The mechanism may detect a dynamic migration and take proper actions based on the system configuration.

The actions may include discarding the output of the scan executed across a dynamic migration and repeat the scan. The actions may also include notifying the initialization subsystem of the non-migration-safe application to execute a script or program to address migration safety issues. One particular program or script may be an agent ID regeneration program or script.

The implementation described above with respect to the illustrative embodiments has a twofold benefit, because it prevents an incorrect behavior of the application (e.g., bad licensing aggregation) that is performing the HW/OS scan, and also propagates the detection, which allows other applications to take proper action. The implementation does not require instrumentation of the specific application against a specific virtualization technology, but leverages underlying capabilities (modularity, VM enabler component, host-guest communication information publishing) of the hardware scanning solution (e.g., CIT).

A similar approach can be foreseen for application virtualization technologies like, for example, workload partition (WPAR) or the detection of other scenarios that cannot be supported due to isolation and unavailable information running in a virtual environments, such as VM cloning.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable medium having a computer readable program recorded thereon, wherein the computer readable program, when executed on a computing device, causes the computing device to:

collect, by a licensing control application, license metrics;

responsive to the licensing control application collecting license metrics, initiate, by the licensing control application executing in a virtual machine, a physical environment scan; and responsive to the licensing control application initiating the physical environment scan, determine, by a motion-safe scan technology in the virtual machine, whether a dynamic migration of the virtual machine occurs during the physical environment scan, the determining comprising:

retrieving, by the motion-safe scan technology, a first host component identifier, wherein the virtual machine comprises an operating system and the licensing control application running on a first host platform, identified by the first host component identifier, within the data processing system;

performing, by the motion-safe scan technology, the physical environment scan;

retrieving, by the motion-safe scan technology, a second host component identifier; and responsive to the motion-safe scan technology determining the second host component identifier is different from the first host component identifier, determining, by the motion-safe scan technology, that a dynamic migration of the virtual machine from the first host platform to a second host platform, identified by the second host component identifier, within the data processing system occurred during the physical environment scan; and perform, by the migration-safe scan technology, at least one action to manage the dynamic migration of the virtual machine responsive to the migration-safe scan technology determining that the dynamic migration of the virtual machine from the first platform to the second platform occurred during the physical environment scan.

2. The computer program product of claim 1, wherein the at least one action comprises returning a specific error to the licensing control application.

3. The computer program product of claim 1, wherein the at least one action comprises repeating the physical environment scan.

4. The computer program product of claim 1, wherein the at least one action comprises notifying the licensing control application that migration of the virtual machine has been detected.

5. The computer program product of claim 4, wherein notifying the licensing control application that migration of the virtual machine has been detected comprises:

triggering the licensing control application to execute a script.

6. The computer program product of claim 5, wherein the script comprises an agent identifier regeneration process.

7. The computer program product of claim 6, wherein the agent identifier regeneration process further notifies a management infrastructure.

8. The computer program product of claim 1, wherein the physical environment scan comprises a hardware scan, a software scan, or an operating system scan.

9. An apparatus, comprising:
a processor; and
a memory coupled to the processor, wherein the memory comprises instructions which, when executed by the processor, cause the processor to:
collect, by a licensing control application, license metrics;
responsive to the licensing control application collecting the license metrics, initiate, by the licensing control application executing in a virtual machine, a physical environment scan; and
responsive to the licensing control application initiating the physical environment scan, determine, by a motion-safe scan technology in the virtual machine, whether a dynamic migration of the virtual machine occurs during the physical environment scan, the determining comprising:
retrieving, by the motion-safe scan technology, a first host component identifier, wherein the virtual machine comprises an operating system and the licensing control application running on a first host platform, identified by the first host component identifier, within the data processing system;
performing, by the motion-safe scan technology, the physical environment scan;
retrieving, by the motion-safe scan technology, a second host component identifier; and
responsive to the motion-safe scan technology determining the second host component identifier is different from the first host component identifier, determining, by the motion-safe scan technology, that a dynamic migration of the virtual machine from the first host platform to a second host platform, identified by the second host component identifier, within the data processing system occurred during the physical environment scan; and
perform, by the migration-safe scan technology, at least one action to manage the dynamic migration of the virtual machine responsive to the migration-safe scan technology determining that the dynamic migration of the virtual machine from the first platform to the second platform occurred during the physical environment scan.

10. The apparatus of claim 9, wherein the at least one action comprises repeating the physical environment scan.

11. The apparatus of claim 9, wherein the at least one action comprises notifying the licensing control application that migration of the virtual machine has been detected.

12. The apparatus of claim 9, wherein the at least one action comprises returning a specific error to the licensing control application.

13. The apparatus of claim 11, wherein notifying the licensing control application that migration of the virtual machine has been detected comprises:
triggering the licensing control application to execute a script.

14. The apparatus of claim 13, wherein the script comprises an agent identifier regeneration process.

15. The apparatus of claim 14, wherein the agent identifier regeneration process further notifies a management infrastructure.

16. The apparatus of claim 9, wherein the physical environment scan comprises a hardware scan, a software scan, or an operating system scan.

17. The apparatus of claim 9, wherein the virtual machine runs in a virtual environment container.

18. The apparatus of claim 9, wherein the first host component identifier comprises a physical machine serial number, type, and model.

19. The apparatus of claim 9, the at least one action comprises running a script to address or prevent problems associated with dynamic migration.

* * * * *